Dec. 10, 1968    J. PONCELET ETAL    3,416,013
COMPOSITE STRUCTURE ELECTRODE AND PROCESS FOR
MANUFACTURING SUCH ELECTRODE
Filed June 22, 1965

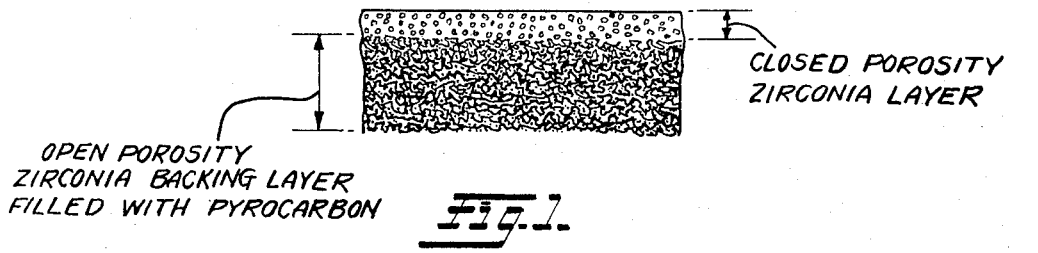

Fig. 1. — CLOSED POROSITY ZIRCONIA LAYER / OPEN POROSITY ZIRCONIA BACKING LAYER FILLED WITH PYROCARBON

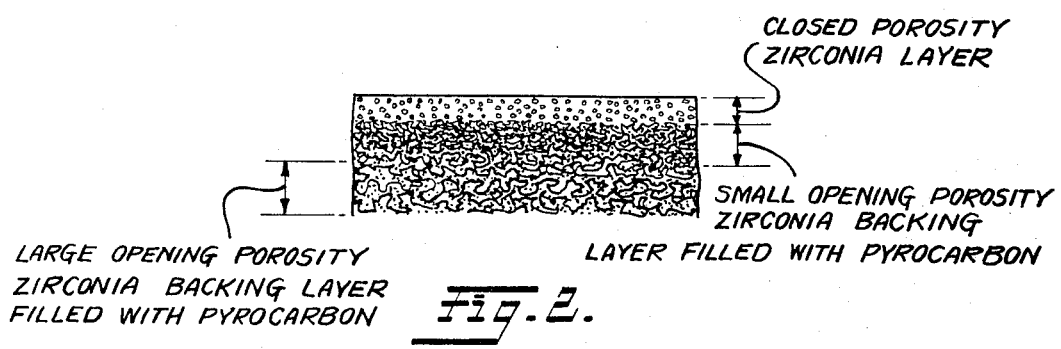

Fig. 2. — CLOSED POROSITY ZIRCONIA LAYER / SMALL OPENING POROSITY ZIRCONIA BACKING LAYER FILLED WITH PYROCARBON / LARGE OPENING POROSITY ZIRCONIA BACKING LAYER FILLED WITH PYROCARBON

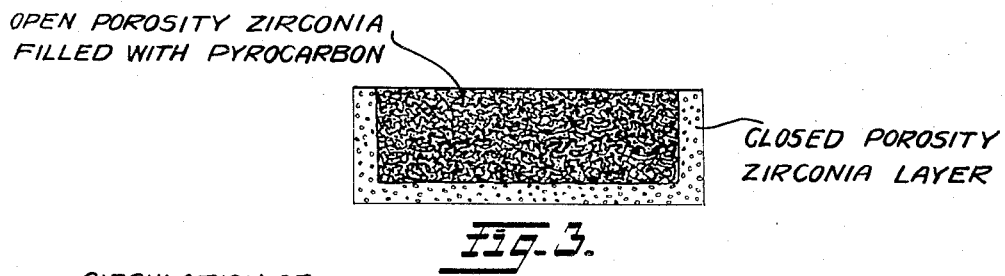

Fig. 3. — OPEN POROSITY ZIRCONIA FILLED WITH PYROCARBON / CLOSED POROSITY ZIRCONIA LAYER

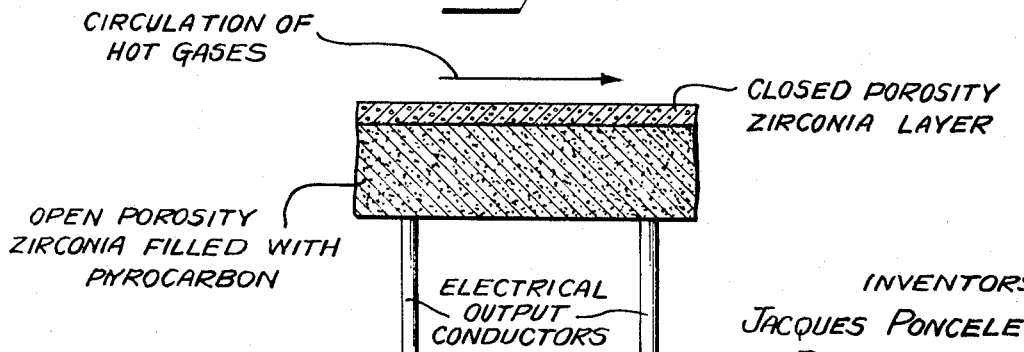

Fig. 4. — CIRCULATION OF HOT GASES / CLOSED POROSITY ZIRCONIA LAYER / OPEN POROSITY ZIRCONIA FILLED WITH PYROCARBON / ELECTRICAL OUTPUT CONDUCTORS

INVENTORS
JACQUES PONCELET
PIERRE BLUM
LOUIS BOCHIROL
CLAUDE MOREAU
BY Bacon & Thomas
ATTORNEYS

United States Patent Office 3,416,013
Patented Dec. 10, 1968

---

3,416,013
COMPOSITE STRUCTURE ELECTRODE AND
PROCESS FOR MANUFACTURING SUCH
ELECTRODE
Jacques Poncelet, Le Vesinet, Yvelines, and Louis Bochirol and Pierre Blum, Grenoble, and Claude Moreau, Seyssinet, France, assignors to Commissariat a l'Energie Atomique, Paris, France
Filed June 22, 1965, Ser. No. 466,519
Claims priority, application France, July 3, 1964, 980,636
14 Claims. (Cl. 310—11)

ABSTRACT OF THE DISCLOSURE

The composite structure electrode formed from zirconia, has a current-receiving side to be exposed to the flow of hot fluids which is substantially nonporous. The other side, which is engaged by the electrical output conductors, is porous and the pores are filled with pyrocarbon. The pyrocarbon filling the pores is provided by impregnating the porous side with a carbonaceous substance which is converted to pyrocarbon by pyrolysis treatment.

---

This invention relates to an electrode for use at high temperatures in a corrosive medium, and to a process for manufacturing the electrode.

More particularly, the invention relates to electrodes having the following features: good electrical conductivity at temperatures of from about 2000 to 3000° K., relatively low heat conductivity, and high chemical and mechanical strength at the temperature specified in a corrosive, for example an oxidising atmosphere.

Electrodes of this kind are very useful for magnetohydrodynamic converters, hereinafter to be referred to by the initials MHD.

It is known to use refractory and possibly stabilised oxides for this purpose, but with the serious disadvantages that penetration of the hot fluid to the inside structure of the very porous electrodes disintegrates the same rapidly, and the electrical conductivity of the electrodes rapidly becomes too reduced at some distance from the surface which is in contact with the hot fluid.

It is also known to use refractory metals, but these corrode and oxidise too rapidly at temperatures above 2000° K. The use of rare metals has also been considered but they are far too costly for industrial use. Anyway, the use of metal electrodes in a MHD generator offers few advantages so far as energy efficiency is concerned since the metals, being good heat conductors, decrease considerably the temperature of the ionized gas leaving the generator. The heat transferred in this way by the "hot" surface of the electrodes, i.e., the electrode surface which is in contact with the fluid—to the "cool" surface, i.e., the electrode surface which is opposite the hot surface and which has current collectors—must be dissipated by a flow of water, with the result that large amounts of water are heated to a reduced temperature, i.e., a relatively poor form of energy is produced. Also, there is substantially negligible thermoionic emission from cooled metal electrodes, and so the current flow at the cathode must be in the form of cathode spots. Some 100 volts or so are required to produce cathode spots, and the power required to produce this voltage is lost so far as the electric power produced in the MHD conversion channel is concerned. Also, cathode spots cause erosion of the electrode. Also, when the electrode "hot" surface temperature becomes too low, e.g. below 1700° K., alkaline salts coming from additions of alkaline compounds in the fluid are deposited, with a consequent increase in the electric contact resistance between the fluid and the "hot" surface of the electrode.

This invention obviates the disadvantages just described. The invention relates to a composite structure electrode formed by a zirconium oxide wafer having a closed porosity in the top part nearest the hot fluid and an open porosity in its bottom part, the wafer pores being filled by pyrocarbon.

In the drawings, which are only for the purpose of illustrating the invention without limiting its scope;

FIGS. 1 and 2 are fragmentary cross-sectional views showing two different modifications of the composite electrode of this invention;

FIG. 3 is a view taken in transverse cross-section of another modification of the composite electrode; and FIG. 4 is a fragmentary, cross-sectional view showing the circulation of hot gases over one surface of the composite electrode of the present invention and a pair of electrical output conductors in engagement with the other side.

To prevent any misunderstanding, the word "zirconia" denotes exclusively zirconium oxide, this particular word having in any case acquired this meaning by use; the oxide may be stabilised, as will be described hereinafter.

There are several reasons why it is a very good idea to use an electrode of this kind. First, the electrode has good chemical and mechanical stability to a high-temperature fluid flow because of the nature of its structure and of its very sealed nature—the fluid can act only on a surface zone of the electrode. Also, the presence of the pyrocarbon network in the composite electrode according to the invention ensures good electrical conductivity thereof for MHD channel purposes, while the presence of the zirconia matrix ensures very reduced heat conductivity. Consequently, electrodes of this kind, even when fairly thick, do not cause a detrimental reduction in the ionized gas temperature, yet also provide good current transmission.

Another advantage is that the variation of the properties of zirconia in dependence upon temperature is helpful, for when its temperature rises its electrical conductivity increases but its heat conductivity varies little and is always very slight. This is a very useful feature for all the purposes for which electrodes of this kind are likely to be used, particularly in the case of an MHD conversion channel, since the current-receiving "hot" surface of the electrode, remaining as it does at a high temperature, can conduct the current, whereas in the less hot regions where the zirconia matrix becomes increasingly less conductive, the pyrocarbon network gradually collects all the current and transmits it to the "cool" surface which is connected to an output conductor. Nor do electrodes of this kind cause an unwanted reduction in the ionized gas temperature, for the heat conductivity of the zirconia matrix is slight and is not greatly altered by the presence of the pyrocarbon network whose heat conductivity at the working temperatures is substantially of the same order as the heat conductivity of the zirconia.

Zirconia can of course be stabilised by the inclusion of some oxides, such as the oxides of calcium, magnesium, yttrium or rare earths. These oxides help the zirconia to keep its structural stability at high temperatures and improve its thermoionic emissivity.

This invention also relates to a manufacturing process wherein a zirconia wafer is prepared which has a closed porosity on the surface subsequently to experience the hot fluids, the porosity becoming increasingly open further away from such surface, the pores being filled with pyrocarbon by an impregnation treatment by carbonaceous substance which has had pyrolysis treatment.

The term "open porosity" means a porosity permitting the penetration of the carbonaceous substance which will subsequently produce the pyrocarbon by pyrolysis.

Except for the top part of the wafer, where a closed porosity is preferred, the zirconia pore size range must be such as excludes the overfine porosity preventing entry of the pyrocarbon-forming agent and such as excludes the over-large porosity which would lead to overlong impregnation times. Conveniently, therefore, there are only a very reduced number of pores smaller than $1\mu$ and larger than $500\mu$. The overall porosity should be such that, after the pores have been filled, the quantity of pyrocarbon contained in the zirconia matrix of the resulting structure is enough to give good electrical conductivity but not so great that the zirconia matrix ceases to be a material which is stable to the fluid around it. Conveniently, therefore the starting material is a zirconia having a density of from 2 to 4.

One form of the process which gives very good results is to effect impregnation by gassing using hydrocarbons, such as methane or natural gas from the Lacq region of France.

The process according to the invention is very economical for it requires only a single step which is given in conventional apparatus. The items for treatment are placed in an enclosure in which the gas flows at a temperature of from 800 to 1000° C. Also, the nature of the resulting pyrocarbon network is excellent since the pyrocarbon has good electrical conductivity (resistivity of the order of $300\mu$ ohm/cm.$^2$/cm. at ambient temperature) and low chemical reactivity.

If required, liquid impregnation processes, such as impregnations with tars or sundry thermosetting agents, such as phenol resins, can be used to fill the pores. However, the liquid impregnation process is more complicated than the gas impregnation process since liquid impregnation must be followed by baking and, as a rule, a number of impregnating and baking cycles are required to ensure satisfactory densification. The nature of the resulting pyrocarbon is less satisfactory than the gas-impregnated material so far as electrical conductivity (some 4 times poorer) and chemical reactivity (higher) are concerned. Gas impregnation is therefore considered to be a preferred form of depositing the pyrocarbon.

Various possibilities for the composite electrode structure can be considered which fall under the general outlines hereinbefore set forth.

As already stated, the invention provides composite electrodes whose structure has a graded porosity. Accordingly, the starting material is a zirconia which can have the following features across its thickness:

On the hot fluid side, a thin low-porosity layer, and below it a considerably thicker high-porosity layer. The low-porosity layer has a density of about 4 and the high-porosity layer has a density, as a rule, of from 2 to 2.5;

On the hot fluid side, a thin low-porosity layer followed by a number, e.g. 3, of layers of increasing porosity, the final and most porous layer being definitely the thickest layer.

Zirconia bricks having the required porosity gradient can be produced, for instance, by a double slip pouring.

The pyrocarbon filling effected as hereinbefore described leads of course to an electrode having, on the hot fluid side, a very little pervious layer containing little pyrocarbon and, lower down, one or more layers having increasing pyrocarbon contents. As a modification, all the zirconia wafer surfaces except the current-collecting surface can be covered by a thin hermetic zirconia layer.

If required, the closed-porosity layer can take the form of a thin U-cross-section shaped zirconia casing which after treatment will receive the relatively porous part of the electrode in a hermetic covering. The U-shape can be produced by conventional ceramic techniques such as slip pouring or by shoopage on a porous zirconia brick. If the U-casing is produced by slip pouring, it can be filled either with a porous brick of appropriate dimensions or with zirconia in powder form.

Two examples will now be described by way of example of how an electrode of use at a high temperature in a corrosive medium can be used and manufactured in accordance with the invention. Constructional features to be disclosed in connection with the example shall be considered as forming part of the invention, and any equivalent systems can of course be used without departing from the scope of the invention.

*Example 1*

The starting material is zirconia which has a density of 2.39 and which has the following pore size range:

$$90\% > 7.5\mu$$

$$40\% > 92\mu$$

The electrode is 20 mm. thick.

Impregnation treatment is given with Lacq gas at 900° C. for 300 hours.

The final result is an electrode containing 40% by volume of pyrocarbon. The electrode has been found to operate very satisfactorily in an MHD converter having the following operating conditions:

Fuel: kersosene containing potassium methylate (in a quantity such that the combustion gases contain 0.8 mol percent of K).
Combustion-supporting agent: $O_2 + 3N_2$
Flame temperature: 2300° K.
Temperature of "hot" surface of electrode: 2000° K.
Temperature of "cool" surface of electrode: 1200° K.

*Example 2*

The electrode takes the form of a zirconia wafer having a density of 2.73 and the following pore size range:

$$90\% > 5\mu$$

$$40\% > 70\mu$$

All surfaces of the electrode except the current-collecting surface are covered by a 5 mm. thick hermetic zirconia layer. The electrode is 20 mm. thick. The wafer is given impregnation treatment with Lacq gas at 900° C. for 230 hours. The electrode is found to operate satisfactorily in an MHD converter having the following operating conditions:

Fuel: kerosene containing potassium methylate (in a quantity such that the combustion gases contain 0.8 mol percent of K).
Combustion-supporting agent: $O_2 + 3N_2$.
Flame temperature: 2300° K.
Temperature of "hot" surface of electrode: 2000° K.
Temperature of "cool" surface of electrode: 1200° K.
Current density: 0.65 A/cm.$^2$ The invention is not of course limited to the embodiments described but covers all equivalent variants. For instance, zirconia, although mentioned here more particularly for the electrode matrix, can be replaced by any other refractory oxide having equivalent physical and chemical properties.

The electrode according to the invention may have very advantageous uses in fields where nothing satisfactory has previously existed, i.e., in cases where the requirement is for materials which are good electrical conductors, poor heat conductors and able to withstand the action of hot and corrosive fluids. One such field which can be mentioned right away is MHD converters.

We claim:
1. A composite structure electrode usable in a magneto hydrodynamic converter channel, comprising: a zirconia wafer having an outer layer of closed porosity on the surface to be exposed to the hot fluid and a contiguous backing layer of open porosity, the pores of the open porosity layer being filled by pyrocarbon.
2. A process for manufacturing an electrode as set forth in claim 1 comprising: forming from zirconia a wafer which has a closed porosity on the surface subsequently to experience the hot fluids, the porosity becoming increasingly open further away from such surface, the pores being filled with pyrocarbon by an impregnation treatment by carbonaceous substance which has had pyrolysis treatment.

3. A process as set forth in claim 2 wherein the impregnation treatment is effected by gas treatment, with the use of hydrocarbons at a temperature of from 800 to 1000° C.

4. A composite structure electrode according to claim 1 in which said backing layer has open pores of a suitable predetermined size, and a second backing layer, having open pores larger in size than those of the first-mentioned backing layer, is contiguous with the surface of the first-mentioned backing layer, which is opposite said outer layer of closed porosity, and pyrocarbon fills the pores of the second backing layer.

5. A composite structure electrode according to claim 1 in which said backing layer comprises a plurality of layers of open porosity, the degree of porosity of each of said backing layers increasing as they are spaced farther away from said outer layer of closed porosity, the open pores of each of the porous layers being filled with pyrocarbon.

6. A composite structure electrode according to claim 1 in which all outer surfaces of said electrode wafer, except current collecting areas on the surface of the wafer opposite that to be exposed to the hot fluid, are covered by a thin hermetic-tight zirconia layer.

7. A composite structure electrode according to claim 1 in which the open pore backing layer is of greater thickness than the thickness of the closed pore outer layer and the porosity of the open pore backing layer becomes increasingly open as the distance away from the closed pore outer layer increases.

8. A composite structure electrode according to claim 7 in which the contents of pyrocarbon in the backing layer increases as the size of the open pores in said backing layer increase.

9. A composite structure electrode according to claim 1 in which the size of the open pores in the backing layer are substantially all in the range between $1\mu$ and $500\mu$.

10. A composite structure electrode according to claim 1 in which the backing layer is of substantially greater thickness than the outer layer of closed porosity; the layer of closed porosity has a density of substantially 4; and the backing layer has a density in the range of substantially between 2 and 2.5.

11. A composite structure electrode according to claim 1 in which said outer layer of closed porosity is a casing of generally U-shaped configuration as viewed in transverse cross-section and said backing layer of open porosity substantially fills the U-shaped casing.

12. A composite structure electrode according to claim 1 in which said backing layer contains substantially 40% by volume of said pyrocarbon, thereby providing good electrical conductivity.

13. A process for making a composite structure electrode usable in a magneto hydrodynamic converter channel, comprising the steps of; forming from zirconia a composite wafer having an outer layer of closed porosity on the surface to be exposed to hot fluids and having a contiguous backing layer of open porosity; filling the open pores of said backing layer with carbonaceous substance which is reduceable at elevated temperatures to pyrocarbon and heating the filled, composite wafer to an elevated temperature in the range of between substantially 800 and 1000° C. for the period of time required to convert the carbonaceous substance filling the pores of the backing layer into pyrocarbon.

14. A process for making a composite structure electrode according to claim 13 wherein the carbonaceous substance is a hydrocarbon gas and the open pores are filled by impregnation with said gas by placing the wafer in an enclosure in which the hydrocarbon gas flows at a temperature of between substantially 800 and 1000° C.

References Cited

UNITED STATES PATENTS

| | | | |
|---|---|---|---|
| 638,838 | 12/1899 | Fessenden | 313—352 X |
| 3,149,253 | 9/1964 | Luebke | 310—11 |

DAVID X. SLINEY, *Primary Examiner.*

U.S. Cl. X.R.

313—311